Jan. 3, 1939.   L. W. MYERS   2,142,914
CULINARY DEVICE
Filed Feb. 26, 1938
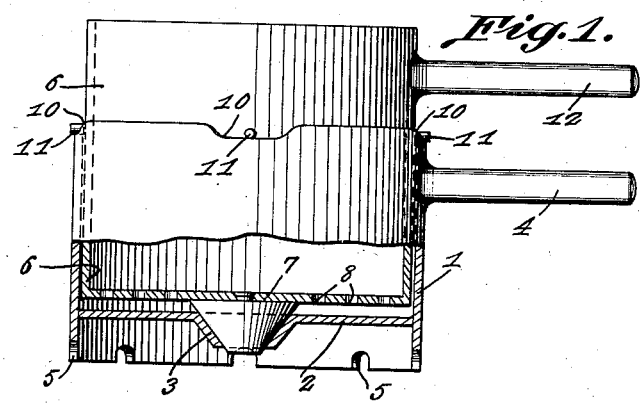
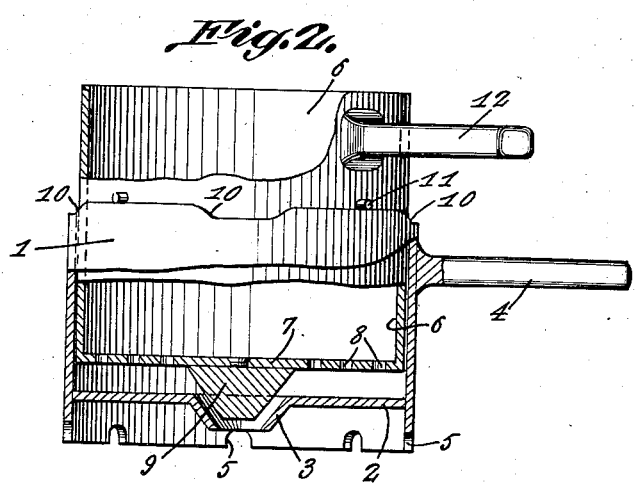
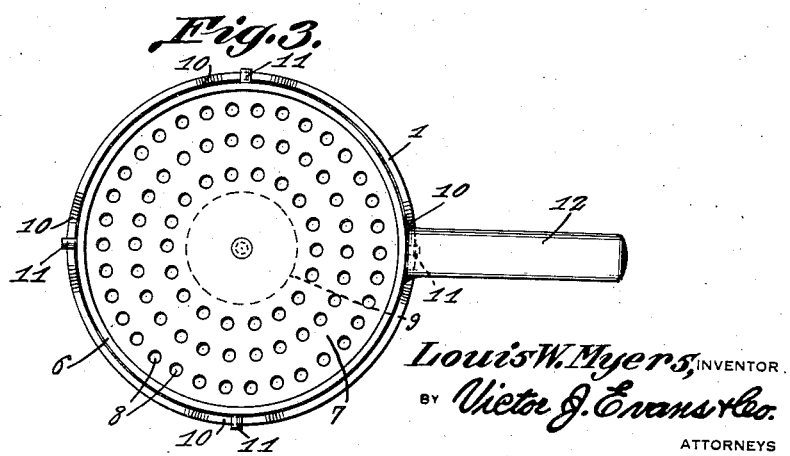
Louis W. Myers, INVENTOR.
BY Victor J. Evans & Co.
ATTORNEYS Patented Jan. 3, 1939

2,142,914

UNITED STATES PATENT OFFICE 2,142,914

CULINARY DEVICE

Louis William Myers, Philadelphia, Pa.

Application February 26, 1938, Serial No. 192,831

3 Claims. (Cl. 210—159)

This invention relates to culinary devices, and its general object is to provide a straining and separating device that is primarily designed for clarifying semi-fluids, such as gravy or the like, in that the device can be used to not only strain the fluid to free the same from lumps and solid matter, but also to remove excess fat or oleaginous matter therefrom.

A further object is to provide a culinary device of the character set forth, that can be readily cleaned, is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view of the device which forms the subject matter of the present invention, with parts broken away and in section, and illustrates the strainer and valve means thereof in normal or closed position.

Figure 2 is a similar view with the strainer and valve means in raised position for opening the outlet.

Figure 3 is a top plan view of the device, with the parts positioned as shown in Figure 1.

Referring to the drawing in detail, it will be noted that my device includes a container 1 that provides the body therefor. The container is of cylindrical formation, in the form as shown, and the upper end is open, while the lower end is closed by a bottom 2 which is provided with a flanged outlet 3 centrally thereof and which is of truncated conical formation to provide a valve seat for a valve member to be later described.

Formed on or otherwise secured to the container 1, is a handle 4 which is shown as extending outwardly therefrom adjacent its upper end, so that the device can be conveniently handled or held over a pan, dish or other receptacle to receive the clarified contents from the device, as will be apparent. However, the device can rest within a receptacle to allow drainage, in that the bottom 2 is elevated above the lower end of the container for disposing the outlet or valve seat accordingly, and the lower end has notches 5 therein providing drainage openings.

Slidably mounted within the container 1 for fitting association therewith, is a cylindrical strainer member 6 which is of a height to extend above the container 1 and is likewise provided with an open upper end and a closed bottom 7, the latter having perforations 8 therein, to allow liquid to drain therethrough.

Secured to the bottom 7 and depending centrally therefrom, is a truncated conical valve member 9 for fitting association with the outlet 3 to be seated therein for closing the same, as shown in Figure 1.

The upper end of the cylindrical wall of the container 1 is provided with equi-distantly spaced elongated recesses 10 having flat lower portions and outwardly inclined side portions, and the strainer member 6 has extending horizontally and outwardly therefrom studs 11, there being a stud for each recess to either rest therein, for disposing the valve on its seat or in closed position, as shown in Figure 1, or the strainer member is elevated for disposing the studs upon the upper edge of the container 1, between the recess 10. When in the latter position, the valve member is raised above its seat or disposed to open position, as shown in Figure 2.

The strainer member 6 is also provided with a handle 12 for lifting, rotating or removing the same, and the handle 12 is preferably similar to the handle 4, as shown. While I have illustrated only one handle 4 for the container, another handle may be provided therefor to extend therefrom diametrically opposite the handle 4, for cooperation therewith to support the device with respect to a receptacle, as will be apparent.

In the use of my device, it is believed that it will be obvious that gravy or other like unctuous semi-fluid material to be clarified is poured into the strainer member 6, after the latter is placed within the container and positioned as shown in Figure 1. The gravy or other material to be strained or clarified is allowed to settle until the fat or oleaginous contents thereof rises to the top, thence the strainer member is raised to elevate the valve member above its seat to open the outlet 3, with the result, the gravy or the like will be strained through the perforations or openings 8, and the clarified material will pass through the outlet, as will be obvious upon inspection of Figure 2. Immediately upon observing the passage of the oleaginous matter through the outlet, the latter can be closed merely by rotating the strainer member to position the studs 11 in the recesses.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A culinary device comprising a container having an outlet in the bottom thereof, straining means removably mounted within the container and slidably fitting the same, valve means carried by the straining means for closing the outlet, means for holding the straining means in elevated position for opening the outlet, and handles for the container and straining means.

2. A culinary device comprising a container having an open upper end, a bottom closing the lower end thereof and having an outlet centrally arranged therein providing a valve seat, a strainer member having an open upper end and a perforated bottom closing the lower end, said strainer member being removably mounted within the container and of a height to extend above the upper end thereof, a valve member mounted on the perforated bottom and depending therefrom to be received on the valve seat for closing the outlet, the upper end of the container having recesses therein and studs extending outwardly from the strainer member to rest upon the upper end of the container between the recesses to retain the valve in open position and to be received in the recesses to seat the valve.

3. A culinary device comprising a cylindrical container having an open upper end and a bottom closing the lower end thereof, said bottom being elevated above the lower end and the latter having notches therein providing drain openings, said bottom having a truncated conical flanged outlet therein providing a valve seat, a cylindrical strainer member having an open upper end and a perforated bottom, a truncated valve member secured to and depending from the perforated bottom and receivable on the valve seat for closing the outlet, the upper end of the container having equidistantly spaced recesses therein, studs extending horizontally from the strainer member and receivable on the upper end of the container between the recesses for holding the valve member in open position, and said studs being also receivable in the recesses to lower the strainer member to dispose the valve member to closed position, and handles for the container and strainer member.

LOUIS WILLIAM MYERS.